(12) United States Patent
Dimsdale et al.

(10) Patent No.: US 7,697,748 B2
(45) Date of Patent: Apr. 13, 2010

(54) METHOD AND APPARATUS FOR HIGH RESOLUTION 3D IMAGING AS A FUNCTION OF CAMERA POSITION, CAMERA TRAJECTORY AND RANGE

(75) Inventors: Jerry Dimsdale, Oakland, CA (US);
Andrew Lewis, Berkeley, CA (US);
William Chen, Lafayette Hill, PA (US)

(73) Assignee: Dimsdale Engineering, LLC, Oakland, CA (US)

( * ) Notice: Subject to any disclaimer, the term of this patent is extended or adjusted under 35 U.S.C. 154(b) by 950 days.

(21) Appl. No.: 10/886,079

(22) Filed: Jul. 6, 2004

(65) Prior Publication Data
US 2006/0006309 A1    Jan. 12, 2006

(51) Int. Cl.
G06K 9/00    (2006.01)
H04N 5/225    (2006.01)
(52) U.S. Cl. .................................. 382/154; 348/169
(58) Field of Classification Search .............. 382/154
See application file for complete search history.

(56) References Cited

U.S. PATENT DOCUMENTS

| | | | |
|---|---|---|---|
| 4,620,788 A | 11/1986 | Giger | |
| 5,446,529 A | 8/1995 | Stettner et al. | |
| 5,453,840 A | 9/1995 | Parker et al. | |
| 5,790,241 A * | 8/1998 | Trussell, Jr. | 356/4.01 |
| 5,892,575 A * | 4/1999 | Marino | 356/5.01 |
| 5,988,862 A | 11/1999 | Kacyra et al. | |
| 6,094,215 A * | 7/2000 | Sundahl et al. | 348/42 |
| 6,133,989 A | 10/2000 | Stettner et al. | |
| 6,176,837 B1 * | 1/2001 | Foxlin | 600/595 |
| 6,195,122 B1 * | 2/2001 | Vincent | 348/169 |

(Continued)

FOREIGN PATENT DOCUMENTS

DE    4109844    6/1992

(Continued)

OTHER PUBLICATIONS

Kalisz, Josef , et al., "Error Analysis and Design of the Nutt Time-interval Digitiser with Picosecond Resolution", *J. Phys. E.: Sci. Instrum.*, 20, (Nov. 1987),1330-1341.

(Continued)

*Primary Examiner*—Bhavesh M Mehta
*Assistant Examiner*—David P Rashid
(74) *Attorney, Agent, or Firm*—Schwegman, Lundberg & Woessner, P.A.

(57) ABSTRACT

A system and method for imaging a three-dimensional scene having one or more objects. The system includes a light source, a detector array, a timing circuit, an inertial guidance system and a processor connected to the timing circuit and the inertial guidance system. The light source generates an optical pulse and projects the optical pulse on an object so that it is reflected as a reflected pulse. The detector array includes a plurality of detectors, wherein the detectors are oriented to receive the reflected pulse. The timing circuit determines when the reflected pulse reached detectors on the detector array. The inertial guidance system measures angular velocity and acceleration. The processor forms a composite image of the three-dimensional scene as a function of camera position and range to objects in the three-dimensional scene.

49 Claims, 7 Drawing Sheets

U.S. PATENT DOCUMENTS

| | | | |
|---|---|---|---|
| 6,246,468 | B1 | 6/2001 | Dimsdale |
| 6,323,942 | B1 | 11/2001 | Bamji |
| 6,330,523 | B1 | 12/2001 | Kacyra et al. |
| 6,359,681 | B1* | 3/2002 | Housand et al. ............ 356/4.01 |
| 6,373,557 | B1 | 4/2002 | Mengel et al. |
| 6,414,746 | B1 | 7/2002 | Stettner et al. |
| 6,420,698 | B1 | 7/2002 | Dimsdale et al. |
| 6,426,468 | B1 | 7/2002 | Utsunomiya et al. |
| 6,448,572 | B1 | 9/2002 | Tennant et al. |
| 6,473,079 | B1 | 10/2002 | Kacyra et al. |
| 6,512,518 | B2 | 1/2003 | Dimsdale |
| 6,512,993 | B2 | 1/2003 | Kacyra et al. |
| 6,535,275 | B2 | 3/2003 | McCaffrey et al. |
| 6,583,863 | B1 | 6/2003 | Smith |
| 6,619,406 | B1 | 9/2003 | Kacyra et al. |
| 6,664,529 | B2 | 12/2003 | Pack et al. |
| 6,734,849 | B2 | 5/2004 | Dimsdale et al. |
| 7,236,235 | B2 | 6/2007 | Dimsdale |
| 7,453,553 | B2 | 11/2008 | Dimsdale |
| 2003/0202089 | A1* | 10/2003 | Alhadef et al. ................ 348/42 |
| 2004/0085526 | A1 | 5/2004 | Gogolla et al. |
| 2007/0252974 | A1 | 11/2007 | Dimsdale |
| 2009/0076758 | A1 | 3/2009 | Dimsdale |

FOREIGN PATENT DOCUMENTS

| | | |
|---|---|---|
| GB | 2292605 | 2/1996 |
| WO | WO-9740342 A2 | 10/1997 |
| WO | WO-03062849 A2 | 7/2003 |
| WO | WO-2006014445 A1 | 2/2006 |

OTHER PUBLICATIONS

Kalisz, Josef, "Review of methods for time interval measurements with picosecond resolution", *Metrologia*, 41, (2004),17-32.

Leskovar, B , et al., "Optical timing receiver for the NASA spaceborne ranging system", *Lawrence Berkeley Laboratoy Report, LBL 8129,* (1978),1-62.

Porat, D , "Review of Sub-Nanosecond Time-Interval Measurements", *IEEE Transactions on Nuclear Science,* vol. NS-20, No. 5, (Oct. 1973),36-42.

Turko, B , "A Picosecond Resolution Time Digitizer for Laser Ranging", *IEEE Transactions on Nuclear Science,* vol. NS-25, No. 1, (Feb. 1978),75-80.

"U.S. Appl. No. 10/886,073, Notice of Allowance mailed Feb. 13, 2007", 7 pgs.

"U.S. Appl. No. 10/886,073, Response filed Aug. 17, 2006 to Restriction Requriement mailed Jul. 17, 2006", 14 pgs.

"U.S. Appl. No. 10/886,073, Restriction Requriement mailed Jul. 17, 2006", 7 pgs.

"U.S. Appl. No. 11/691,256, Notice of Allowance mailed Jul. 14, 2008", 7 pgs.

"U.S. Appl. No. 11/691,256, Preliminary Amendment filed Mar. 26, 2007", 3 pgs.

"U.S. Appl. No. 11/691,256, Response filed Apr. 11, 2008 to Restriction Requirement mailed Dec. 13, 2007", 7 pgs.

"U.S. Appl. No. 11/691,256, Restriction Requirement mailed Dec. 13, 2007", 8 pgs.

Marino, R M, "3D imaging laser radar with photonic sensitivity", *Proc. IRIS Systems,* (May 1996), 1-19 pgs.

\* cited by examiner

METHOD AND APPARATUS FOR HIGH RESOLUTION 3D IMAGING AS A FUNCTION OF CAMERA POSITION, CAMERA TRAJECTORY AND RANGE

CROSS-REFERENCE TO RELATED APPLICATION

This application is related to U.S. patent application Ser. No. 10/886,073, entitled "System and Method for Determining Range in 3D Imaging Systems", filed on even date herewith, which is incorporated herein by reference.

BACKGROUND OF THE INVENTION

1. Field of the Invention

This invention relates to imaging of objects by laser radar and more particularly to imaging based on an array of semiconductor detectors.

2. Background Information

Laser techniques, such as LADAR (Laser Detection and Ranging) or "LIDAR" (Light Detection and Ranging), are used to image objects in three-dimensional image systems. Light, often from a laser source, is directed toward an object of interest. Reflected light from the object is then gathered and focused on one or more photodetectors.

LADAR and LIDAR systems are capable of determining the distance to an object, for example, by timing the travel time of light pulses sent round trip from a source to the object and back to a detector. However, adapting such systems to image remote objects challenges the sensitivity and speed of available devices.

In some laser imaging systems either the scanner or the receiver is scanned across the object, and multiple laser pulses are used to probe the contours of the object. An example of such an approach is shown in U.S. Pat. No. 6,734,849, issued to Dimsdale et al. on May 11, 2004.

Scanner-less approaches have been described as well. Marino, in U.S. Pat. No. 5,892,575 (1999), describes two categories of laser radar systems: scanning and scannerless. Scanning systems include a mechanical device for aiming a laser toward discrete points and for collecting light reflected from those points. Scannerless systems use an array of detectors to detect light reflected from a scene. A processor records the position of light detectors within the array that detected the reflected light and the corresponding travel time of the pulse of light to each of the detectors.

Scanning systems tend to be expensive. The mechanics of the scanner are complex. They also increase the weight of the system and reduce reliability. Scannerless systems, on the other hand, have difficulty building an accurate three-dimensional scene from a series of discrete images.

What is needed is a system and method for imaging that addresses the above shortcomings, and other shortcomings that will become apparent in reading the following description.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
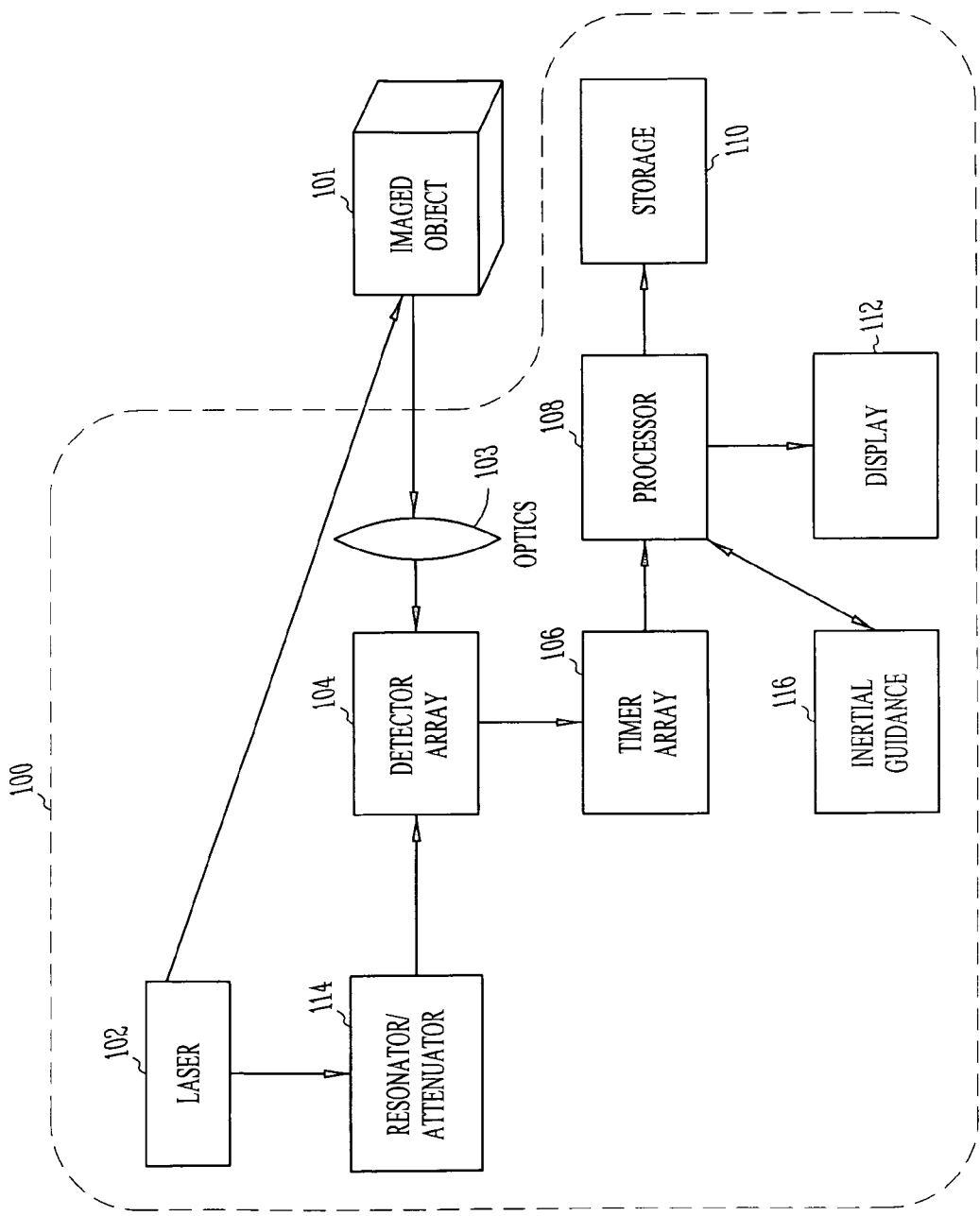
FIG. 1 illustrates an imaging system according to the present invention.

A representative system 100 for creating a high resolution three-dimensional image of a scene of interest 101 is shown in FIG. 1. A pulsed light source 102, typically a laser, is directed toward target scene 101. A portion of the light is reflected back from the scene. An array of detectors 104 receives the light from portions of the scene. The distance from the system to the portion of the scene 101 in the field of view of a single detector is determined by the time required for the light to illuminate that portion and then return to the detectors 104.

In the embodiment shown in FIG. 1, imaging system 100 includes a laser 102, optics 103, a detector array 104, a timer circuit 106, a processor 108, storage 110 and a display 112. In one embodiment (such as is shown in FIG. 1), system 100 also includes a resonator/attenuator 114 used to calibrate system 100 and an inertial guidance system 116 used to establish the position of imaging system 100. System 100 measures the round trip time for a reflected laser pulse from one or more targets for each of a two-dimensional array of pixels, providing an image with millimeter range accuracy and resolution.

In one embodiment, system 100 includes a scanner mechanism (not shown) for directing light from laser 102 to a specific point or scene of interest. In another embodiment, imaging system 100 is a scannerless system that is pointed at particular scenes of interest.

Figure 2:
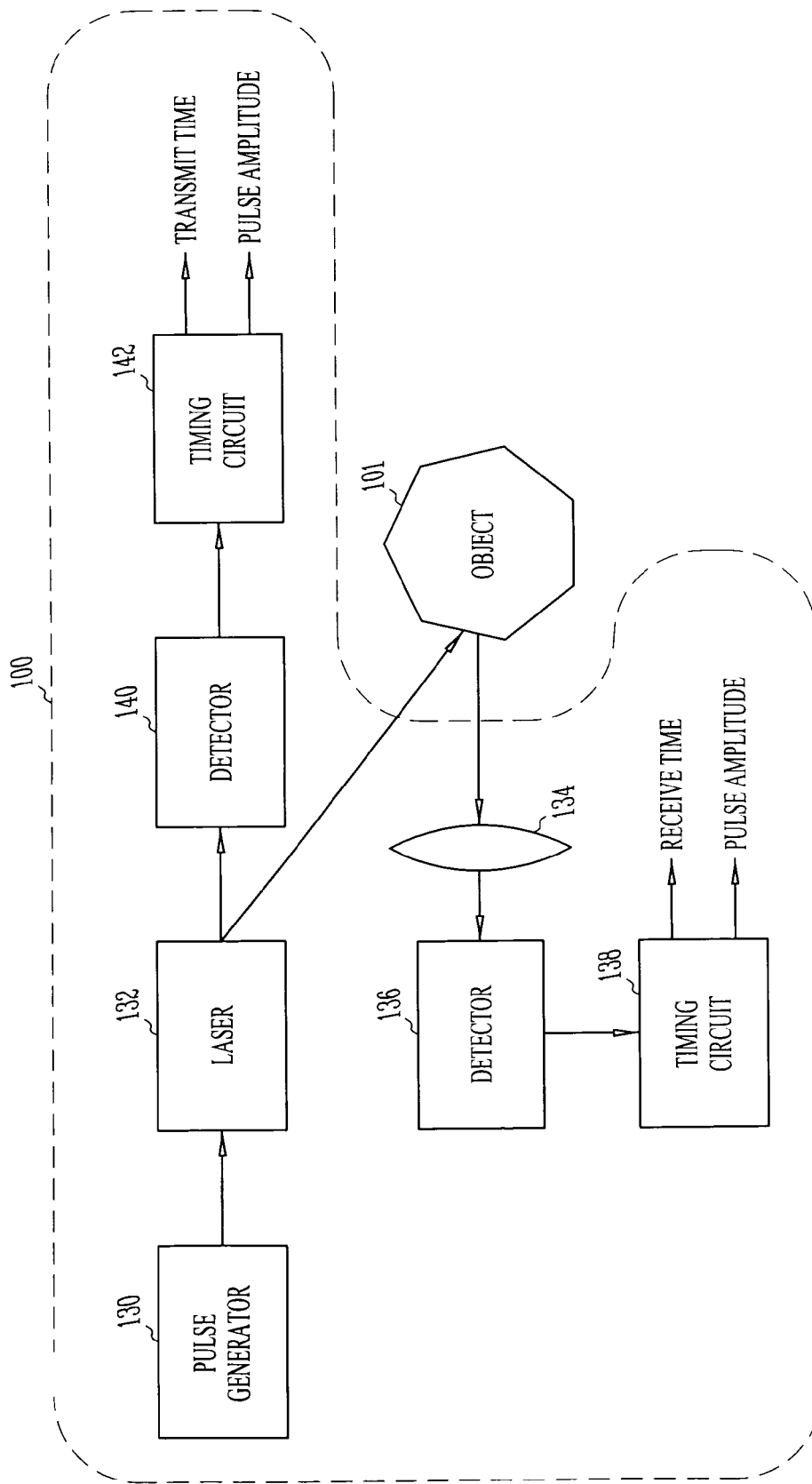
FIGS. 2 and 3 illustrate other embodiments of an imaging system.

In one embodiment, such as is shown in FIG. 2, system 100 includes a pulse generator 130 connected to a laser 132. The pulse generator issues an electrical pulse which is turned into an optical pulse by laser 132. If the time from generation of the electrical pulse to the optical pulse is repeatable, transmit time can be determined from generation of the electrical pulse by pulse generator 130. If not, transmit time can be determined based on generation of the optical pulse by laser 132.

System 100 measures the round trip time for reflected laser pulse from one or more targets for each of a one or two-dimensional array of pixels, providing an image with millimeter range accuracy and resolution. In the embodiments shown in FIG. 2, optics 134 and detector 136 receive light reflected from object 101. Each detector 136 is connected to a timing circuit 138. In one embodiment, each timing circuit 138 includes a plurality of interpolators.

An optical pulse is transmitted toward object 101 so that a portion of the optical pulse is reflected from the object as a reflected pulse. The reflected pulse passes through optics 134 and falls on detector 136. The time for the optical pulse to bounce off object 101 and arrive at one or more of the detectors 136 is used to determine range to object 101. In one embodiment, detecting arrival of the reflected pulse includes integrating the reflected pulse over a predetermined interval of time to determine a reflected pulse characteristic and recording a value representative of when the reflected pulse arrived at detector 136. Range is then calculated as a function of the transmit time, the receive time and the reflected pulse characteristic.

As noted above, there often-times is an undeterminable lag between stimulation of laser 132 with an electrical pulse and issuance of an optical pulse by laser 132. In such instances, transmit time must be calculated from issuance of the optical pulse. In one embodiment, such as is shown in FIG. 2, system 100 includes detector 140 and timing circuit 142. Detector 140 and timing circuit 142 can be used to determine transmit time for the optical pulse.

Figure 3:
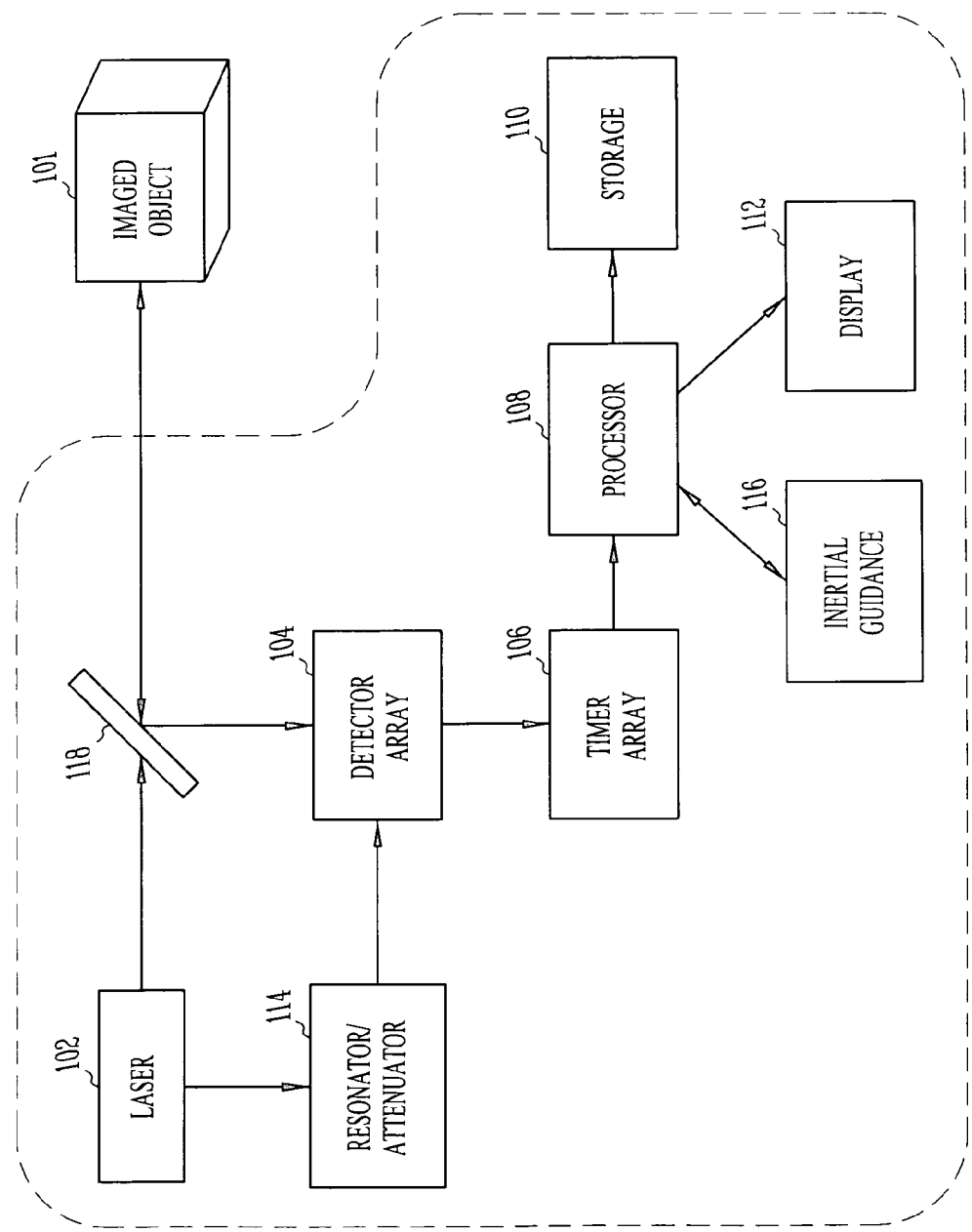

In another embodiment, such as is shown in FIG. 3, light from the outgoing optical pulse is partially reflected to detector 136 by mirror 118.

Detectors 136 and timing circuits 138 and their methods of operation are described in U.S. patent application Ser. No. 10/886,073, entitled "System and Method for Determining Range in 3D Imaging Systems", the descriptions of which is incorporated herein by reference.

In one embodiment, detector arrays 104 and 136 and timer arrays 106 and 138 are implemented as a hybrid of two chips, an array of detectors connected to an array of processing electronics unit cells. Each detector on one chip is connected to its own processing-electronics unit cell on the other chip. This defines one voxel in the image. Each processing-electronics unit cell on the array contains an identical and unique integrated circuit which can store one or more reflected-pulse transit times and either the associated reflected-pulse energy or peak amplitude. Transit-time and pulse amplitude information for all pixels is read out preferably between laser pulses.

In an alternative embodiment, the array of detectors and their associated processing-electronics unit cells are distributed throughout an integrated circuit. While this has the disadvantage of providing a smaller proportion of surface area to collect photons, it can be produced much more economically since the two chips do not need to be mated.

Figure 4:
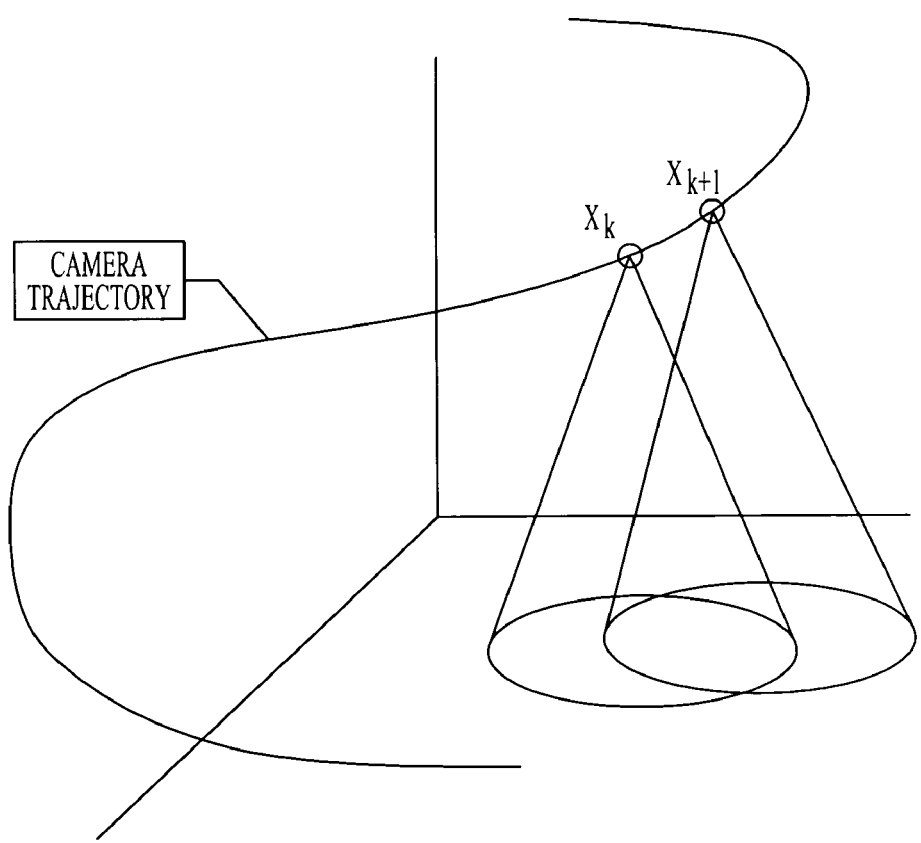
FIG. 4 illustrates movement of a camera across a three-dimensional scene.

An array lidar produces range images at a high rate—anywhere from several frames per second to several thousand frames per second. Depending on the motion of the lidar, sequential images will have some level of overlap, and this overlap can be used to align them. An example of overlap is shown in FIG. 4.

Various algorithms have been proposed to align range images based on point alignment (often known as range image registration). Most depend on an iterative approach which is designed to minimize the differences between the datasets on areas which they have in common. These depend, however, on an initial estimate of the pose of the acquisition equipment.

Besl and McKay, in their article entitled "A Method for Registration of 3-D Shapes," published in *IEEE Transactions on Pattern Analysis and Machine Intelligence*, vol. 14, no. 2, February 1992, introduced the Iterative Closest Point (ICP) algorithm to register two sets of points on a free-form surface. ICP is a general-purpose, representation-independent method for the accurate and computationally efficient registration of 3-D shapes including free-form curves and surfaces. Extensions of this algorithm are now widely used for registration of multiple sets of surface data. The original algorithm registers two point sets provided that the transform between the sets is approximately known.

The ICP algorithm has been extended to multiple range images; a good example, introduced by Pulli in his article entitled "Multiview Registration for Large Data Sets," *Proceedings of Second International Conference on* 3*D Digital Imaging and Modeling* (3DIM'99), Ottawa, Canada, October 1999, is to do a series of pairwise registrations, and at the end subsample the overlap of each pair. Then a global algorithm is used to find the set of transformations that minimizes the squared distances between these subsampled points.

Inertial guidance systems enable the computation of position and orientation over time—the system trajectory. A modern inertial navigation system generally includes inertial sensors such as gyroscopes and accelerometers that are rigidly attached to the system. The gyroscopes measure angular rotation, and the accelerometers measure acceleration in an inertial reference frame.

The alignment of images from an array lidar requires an initial estimate of their position in space. This estimate will depend on the motion of the lidar equipment and the orientation of its field of view. While this can be estimated with an inertial guidance system, the accuracy of the inertial guidance and the alignment algorithm can be enhanced if the position and orientation of both are estimated simultaneously.

Figure 5:
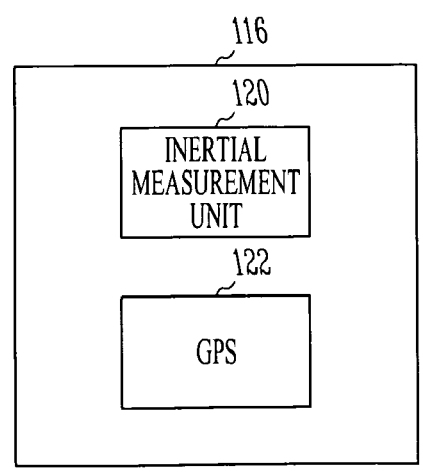
FIG. 5 illustrates an inertial guidance system which can be used in the imaging systems shown in FIGS. 1-3.

In one embodiment, as is shown in FIG. 5, inertial guidance system 116 includes an inertial measurement unit 120. Inertial measurement unit 120 provides approximate estimates of the relative motion of a lidar array between acquisitions of sequential frames; this provides a good initial estimate of the relative position and orientation of those images. In one embodiment, as is shown in FIG. 5, inertial guidance system 116 includes a GPS receiver 122; GPS receiver 122 improves the accuracy of the inertial system, and working together they can produce better trajectory estimates than either alone. In addition, a level and/or a compass can facilitate initialization of inertial guidance system 116.

In current three-dimensional acquisition systems, a significant processing effort is required after the data are collected before the individual frames can be placed in the same frame of reference. Most algorithms for performing this task depend on a good initial guess for the relative position of individual frames. However, a long sequence of frames can acquire a large numerical instability, resulting in an apparently deformed object.

Additional sensors can help resolve the initial position values. Extremely expensive sensors, such as inertial navigation systems, can help resolve the numerical stability problems. However, similar results can be obtainable with very inexpensive sensors coupled with an advanced position estimation algorithm; they provide results similar in character and benefits to the more expensive inertial systems.

Most accurate inertial navigation systems use three kinds of sensors: a set of gyros to determine angular velocity, a set of accelerometers to determine linear acceleration, and a GPS radio to determine absolute position. While the gyros and accelerometers work well over a short period of time, they can drift over a longer period of time. In contrast, the GPS receiver does not give good results over a short period of time, but it is very stable over a longer period of time. The information from the three sets of sensors is integrated with a Kalman filter estimation algorithm, which makes the best use of all three sensor types in producing a combined overall position estimate at each point in time.

Figure 6:
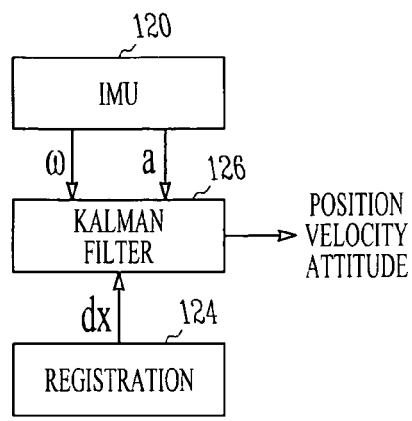
FIGS. 6-8 illustrate various embodiments of Kalman filtering to achieve accurate position and trajectory information according to the present invention.

Since, as is shown in FIG. 4, the camera data is all given relative to the camera itself, a correct scene registration accurately describes the camera location as well. Similar to the GPS receiver, the registration estimates of camera position will be quite stable if the camera moves slightly. Consequently, the results from the scene registrations can be formulated in an extremely similar way to the GPS receiver, and integrated with the gyros and accelerometers to provide a combined position estimate of the camera position. As a result, the camera position and the registration can be greatly improved over when their results are only considered separately. Such an approach is shown in FIG. 6.

The fundamental operation applied in most scene registration algorithms is the iterated closest point algorithm (ICP), which minimizes the error between pairs of surfaces $S_0$ and $S_1$, and a global registration process that minimizes the error between all the pairs. The ICP works by applying the following iterative procedure:

1) We assume that we are given an initial transformation $T_0^1$ such that the scans $S_0$ and $T_0^1 S_1$ are approximately aligned, and we wish to refine this transformation to find the correct alignment.

2) For each point $P_j$ in $S_0$ we find the point $Q_j$ in a surface defined by $S_1$ with the minimal distance between $P_j$ and $T_i^1 Q_j$, and similarly for each point Qj in S1 we find the point $P_j$ in a surface defined by S0 with minimal distance between $P_j$ and $T_i^1 Q_j$.

3) We find the transformation $T_{i+1}^1$ that minimizes the sum of the square distances between $T_{i+1}^1 Q_j$ and $P_j$.

4) Repeat steps 2 and 3 until the distance between the two surfaces $f = \Sigma_j w_j |P_j - Q_j|^2$, is minimized.

As an essential part of the derivation, we have found a closed form for the gradient and Hessian of f in terms of the 6-vector $G_i$ formed by concatenating the normal, $N_i$, and $N_i \times P_i$:

$$\nabla(f) = \sum_i (2 d_i w_i' + 2 w_i' d_i^3) G_i$$

$$H(f) = \sum_i (2 w_i + 10 d_i^2 w_i' + 4 d_i^4 w_i'') G_i G_i'$$

In one embodiment, system 100 combines the information from cloud registration 124 with that from an inertial measurement unit 120 using a Kalman filter 126. A Kalman filter is used to estimate some n-dimensional quantity $x_k$ at each of several times based on 1-dimensional measurements $z_k$.

Figure 7:
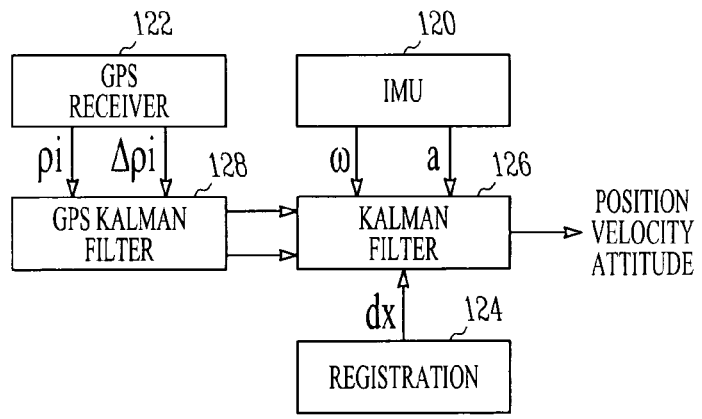

Inertial measurement unit 120 provides initial estimates for a pairwise registration between sequential frames. A global image registration algorithm can be used to place all the data in a common reference frame. The algorithm for computing the inertial estimates and the global registration can cooperate to provide better accuracy than either alone. A GPS receiver 122 provides data that coupled with the inertial data and the registration results provides better overall accuracy. Such an approach is shown in FIG. 7.

Figure 8:
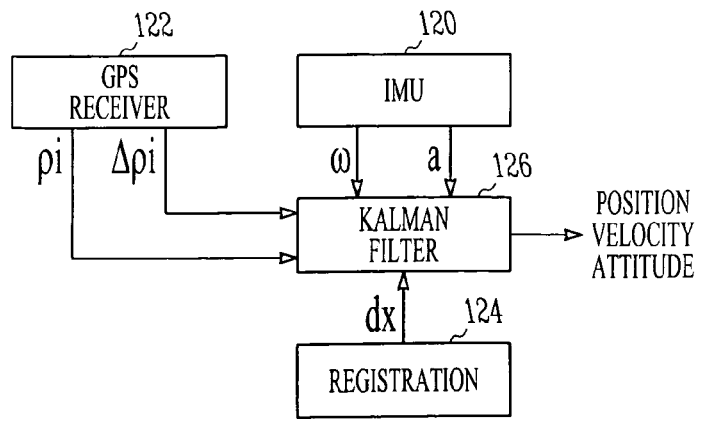

In one embodiment, such as is shown in FIG. 8, Kalman filter 128 associated with GPS receiver 122 is integrated with the registration and inertial estimator of Kalman filter 126, to provide an efficient overall estimator in real time. In each case, the Kalman filter can additionally provide estimates of accelerometer bias and scale factor, and gyroscope bias and scale factor.

In applying our Kalman filter(s), we assume we have:

1. A system or plant model. This consists of an n×n matrix $\Phi_k$ describing the expected transition from state $x_k$ to state $x_{k+1}$ and an n-dimensional random variable $w_k$ modeling the measurement noise. Thus, the dynamics of the system are given by $$x_{k+1} = \Phi_{k+1} x_k + w_k$$

The covariance of $w_k$, which is the expected value E $\langle w_k w_k^t \rangle$ is denoted $Q_k$.

2. A measurement model. This consists of 1×n matrix $H_k$ describing the measurement, and an 1-dimensional random variable $v_k$ modeling the measurement noise, so we have $$z_{k+1} = H_k x_k + v_k$$

The covariance of $v_k$, $E \langle v_k v_k^t \rangle$ is denoted $R_k$.

Given as inputs $\Phi_k$, $z_k$, $H_k$, $R_k$ and $Q_k$, the Kalman filtering equations give an optimal estimate $\hat{x}_k$ for each state of the variable x and a covariance matrix $P_k$ giving the expected error covariance, that is $P_k = E \langle (\hat{x}_k - x_k)(\hat{x}_k - x_k)^t \rangle$.

We sample data from inertial measurement unit 120, a set of accelerometers and gyroscopes attached to our 3d camera. This consists of continuous output from an accelerometer and a gyroscope. We integrate the inertial data to get a preliminary estimate for the position, velocity and attitude (orientation) of our camera at the time of each scan.

The quantity x to be estimated by the Kalman filter is the nine-dimensional vector consisting of the errors in position, velocity, and attitude (i.e. the deviation of the actual path from the preliminary estimate), measured in the reference coordinate system. The attitude error is linearized in the usual axis-times-angle manner. The matrix $\Phi$ is determined from the equations of motion.

Rogers, in "Applied Mathematics in Integrated Navigation Systems", published in 2000, defines $R_a$ to be the 3×3 matrix such that $R_a v = a \times v$ for any vector v, where a is the acceleration (inertial acceleration minus gravity). Then let F be the 9×9 matrix written with 3×3 blocks:

$$F = \begin{pmatrix} 0 & I & 0 \\ 0 & 0 & R_a \\ 0 & 0 & 0 \end{pmatrix}.$$

Then $$\Phi = \exp(F \cdot \delta t) \approx I + F \cdot \delta t + F^2 (\delta t)^2 / 2.$$

The covariance matrix Q for the process noise has been determined as part of the calibration process. This model can also be extended, as in Rogers, ch. 12, to estimate specific sources of bias in the instruments in addition to errors in the path.

In Kalman filtering, the measurement noise v is assumed to be a zero mean Gaussian process. This means the probability density $\psi$ of v is of the form $$\psi(z) = \frac{1}{\sqrt{(2\pi)^n \det(P)}} e^{-\frac{1}{2} z^t P^{-1} z},$$

and the covariance is $$E \langle v^t v \rangle = \int_j \eta \psi(z) z^t z = P$$

In the case of cloud registration, suppose that we have correct point-to-plane correspondences between two scans. Then the distribution of point-to-plane distances $d_i$ can be considered approximately Gaussian with standard deviation $\sigma$. In this case, the probability of a particular transformation $T_i$ giving the correct registration would be proportionate $\Pi_i \exp(-d_i^2/2\sigma^2)$, where the $d_i$ are the distances between corresponding points after the transformation is applied. We can find the most likely registration by minimizing the objective function $f = \Sigma_i d_i^2 / 2\sigma^2$, and we would expect our mean error to be approximately $\sigma/\sqrt{n}$ where n is the number of points.

Further, this function would give a Gaussian probability distribution on the (linearized) space of transformations, and the covariance matrix would be the inverse of the Hessian of $f$. In the cloud registration process, given two overlapping scans, we attempt to find the correct registration by minimizing an objective function $f$ which is an estimate of the average square distance between the two scans in their overlapping region. At the end of the process we also get an estimate for the Hessian matrix $$\left(M = \frac{\partial f}{\partial p_i \partial p_j}\right)$$

of second partial derivatives with respect to the 6 parameters $p_i$ (translations and rotations). The output of the cloud registration process is a transformation (position and orientation). In the simplest case, for each successive pair of scans, we run a pairwise cloud registration using the inertial data to give an initial transformation, and getting as output the 6-vector describing the translation and rotation from this initial transformation to the final transformation. We can treat this transformation as a measurement, and estimate its covariance as a scalar multiple of $M^{-1}$, the inverse of the Hessian matrix.

In basic Kalman filtering, we start with an estimate of the entire trajectory (called the nominal trajectory) based on inertial data, and then use the measurement data to estimate deviation at each step from this initial path. Thus, even when the state space is non-linear (as with rotations), the quantity x to be estimated is a linearized deviation, and propagates linearly. As the estimated trajectory diverges from the nominal trajectory, the linear approximation becomes less accurate.

In extended Kalman filtering, we estimate the (non-linear) state directly at each time step, making a new linearization of the state space around the predicted state $(\hat{x}_k(-))$ at each step. Thus, the linear approximations will remain valid even as the nominal and estimated trajectories diverge. The matrices $\Phi$ and $H$ remain the same, but are evaluated at the estimated state. Despite slightly more computation, it has higher accuracy.

When a series of scans are made in a loop (or in some way so that the overlaps have a more complicated topology), so that there is overlap between the first and last scan in the sequence, attempting to add the scenes to a global coordinate system one at a time using pairwise registration can leave noticeable errors, due to the accumulation of the small errors in each pair. In registration, we account for this by doing a pairwise registration between each pair of overlapping scans, and then using a global algorithm to minimize the sum of all the objective functions.

The problem in Kalman filtering is analogous: a basic Kalman filter uses the system and measurement models to find an optimal estimate for each position based on the data collected at that time and before, but we want to estimate each position using all data, including that collected afterward. As mentioned, in the simplest case (a minimally constrained registration, i.e. when there is no closure to the scene), there is not enough information to improve our previous estimates in this way. There are two cases where there can be extra constraints that can help in this way:

If there are registrations between non-consecutive scans in addition to those between consecutive ones, we can use the global registration to give an estimate of absolute positions for each scan. First do all necessary pairwise registrations, using the inertial data to determine which ones overlap and to create initial estimates. A global registration results in the computation of a covariance with respect to all parameters based on the composite objective function. The results of the global registration can be used as measurement inputs in the Kalman filter. Finally, estimate each position using the Rauch-Tung-Striebel two-pass smoother, which essentially runs a Kalman filter forward and then backward in time. This should not add much time to the overall process, since the global registration is much less computationally intensive than the pairwise ones.

If we also collect global positioning system (GPS) data from the camera and there is registration information only between consecutive scans, we can use all the information in a two-step process. First, we combine the registration information with the inertial information at each step (as in the simple case without GPS information) into a single estimate for the position (and its covariance) relative to the previous step. Then, combine this with GPS information in the standard way. In other words, the inertial data and the registration are both part of the dynamic model, and the GPS data serves as the measurement model.

In the most general case, we will have inertial data, global registration data, and global positioning data.

We consider first the case in which we have only pairwise registrations between successive scans. The inertial data gives us an estimate of the error in the current state (position, velocity, and orientation) $\hat{x}_k$ and a covariance $P_k$. Recall that the state and covariance propagate according to the equations $$\hat{x}_k(-) = \Phi_{k-1} \hat{x}_{k-1}(+)$$

$$P_k(-) = \Phi_{k-1} P_{k-1}(+) \Phi_{k-1}^t + Q_{k-1}$$

We define the relative covariance $$P_k^r(-) = P_k(-) - P_{k-1}(+)$$

$P_k^r(-)$ is positive definite, and describes the uncertainty in our estimate of the position, relative to the previous estimate.

The registration gives an estimate $z_k$ of the current state (position and orientation) relative to the previous state, and a covariance $R_k^r$. (These are relative estimates, but should be written here in the fixed coordinate system.) Let $H$ be the 6×9 matrix written in 3×3 blocks as $$\begin{pmatrix} I & 0 & 0 \\ 0 & 0 & I \end{pmatrix}.$$

Then we can use a relative version of the Kalman filter equations to find the optimal estimate $\hat{x}_k(+)$ of the state. Let $$K_k = P_k^r(-) H^t (H P_k^r(-) H^t + R_k^r)^{-1}$$

Then the estimate is $$\hat{x}_k(+) = \hat{x}_k(-) + K_k[z_k - H\hat{x}_k(-)],$$

with relative covariance $$P_k^r(+) = [I - K_k H] P_k^r(-)$$

and absolute covariance $$P_k(+) P_{k-1}(+) + P_k^r(+).$$

When the camera takes an image of the same area twice at different points in time the registration will be over-constrained. In that case we can first run a global registration; the output of the global registration will be an estimate of the absolute position error $z_k$ of each scan, along with an estimated covariance $R_k$. We can then use this data as the measurement data in the Kalman filter, along with the motion estimates $\Phi_k$ and covariances $Q_k$ from the inertial unit. Then the usual Kalman filter equations apply to find the state error estimates $\hat{x}_k$:

$$\hat{x}_k(-)=\phi(k)\hat{x}_{k-1}(+)$$

$$P_k(-)\Phi_{k-1}P_{k-1}(+)\Phi_{k-1}{}^t+Q_{k-1}$$

$$K_k=P_k(-)H^t[HP_k(-)H^t+R_k]^{-1}$$

$$\hat{x}_k(+)=\hat{x}_k(-)+K_k[z_k-H\hat{x}_k(-)]$$

$$P_k(+)=[I-K_kH]P_k(-)$$

Using the method of the Rauch-Tung-Striebel two-pass smoother, we then take a second pass through the data, finding optimal estimates of the state $\hat{x}_{[s]k}$ and its covariance $P_{[s]k}$ by the formulas:

$$A_k=P_k(+)\Phi_k{}^tP_{k+1}{}^{-1}(-)$$

$$\hat{x}_{[s]k}=\hat{x}_k(+)+A_k(\hat{x}_{[s]k+1}-\hat{x}_{k+1}(-))$$

$$P_{[s]k}=P_k(+)+A_k(P_{[s]k+1}-P_{k+1}(-))A_k{}^t$$

When there is GPS data in addition to global registration data, we will need to use a more complicated method to minimize the total least squares errors from the different sources of data. The quantity to be minimized is as follows. For each scan, the GPS gives a measured position $z_i$ with covariance matrix $R_i$. The INU gives a relative transformation $T_i^1$ between the i and (i+1) positions with covariance matrix $Q_i^1$, and the registration gives relative transformations $T_{ij}^R$ with covariance matrix $Q_{ij}^R$ for some subset S of ordered pairs (i, j). For any set of candidate transformations $\{T_i\}$, let $p_i$ be the position difference $T_i(0)-z_i$, $X_i^1$ be the linearization of the difference transformation $$T_i^1T_{i+1}{}^{-1}T_i,$$

and $X_{ij}^R$ the linearization of the difference transformation $$T_{ij}^RT_j^{-1}T_i.$$

Then we wish to find the transformations that minimize the sum $$\sum_i p_i^t R_i^{-1} p_i + \sum_i X_i^I (Q_i^I)^{-1} X_i^I + \sum_{(i,j)\in S} X_{ij}^{R^t} (Q_{ij}^R)^{-1} X_{ij}^R$$

Other issues normally required for Kalman filter implementation includes calibration and determining initial conditions.

The dynamic parameters have to be carefully calibrated to give a good estimate of current position based on the raw data from the accelerometer and gyroscope. This will need to take into account cross-axis terms, coupling between the two, etc. We also need to determine in advance the relation between the coordinate systems inherent in the raw data from the inertial unit and the raw data of a scan; the formulas above assume that these have already been reconciled. One can also add terms to the Kalman filter state vector to make real-time estimates of bias and drift in the instruments.

Regarding instrumentation for initial conditions, a level and/or a compass will aid in estimating the initial pose of the system, and in establishing agreement between the coordinate systems of the different sensors.

A core principle of any pulsed lidar system is to measure the time between when a pulse is emitted and when a reflected pulse is received. Light travels at the speed of light, $c_m$, for the medium in which it travels. Thus for a target which is d meters away, the round trip time is $t=2d/c_m$. In air this is roughly 6.7 psec/mm, so the fundamental problem in a millimeter resolution pulsed lidar is to measure time to an accuracy of a few picoseconds. Some techniques have been successful in making millimeter measurements in a single pixel system, but for a variety of reasons there have been difficulties in applying them to a sensor array. While numerous efforts have been made to measure time intervals in a focal plane array to millimeter accuracy, so far all have fallen short of this goal.

Figure 9:
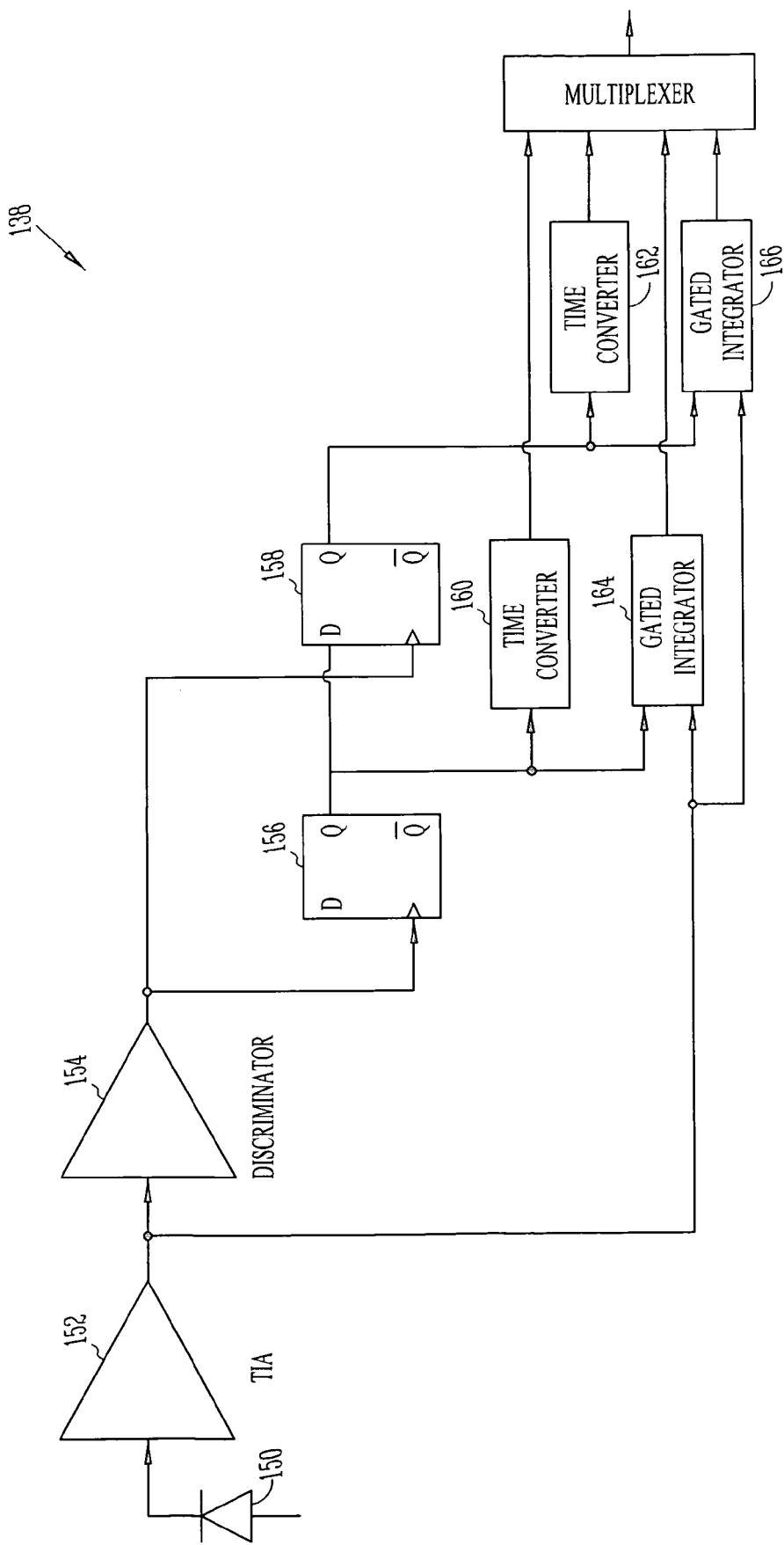
FIG. 9 illustrates a detector and a timing circuit according to the present invention.

A timing circuit 138 which can be used in system 100 of FIGS. 1-3 is shown in FIG. 9. In the timing circuit shown in FIG. 9, the returning light is detected by detector 150 and converted to an electrical signal. The signal is amplified by transimpedance amplifier (TIA) 152, and then converted into a signal appropriate to trigger a flip-flop by discriminator 154. The output of flip-flop 156 goes high when a first pulse is detected, and the output of flip-flop 158 goes high only when a second pulse is detected. The time of arrival of the two pulses is converted to a digital signal by time converters 160 and 162 and read out through multiplexer 168.

In one embodiment, timing circuit 138 includes gated integrators 164 and 166. The amplitude of the two pulses is determined by integrating the signal from slightly before the pulse starts until shortly after the pulse ends. In an alternative implementation, a peak detector is employed rather than a gated integrator. While simpler to implement, this is likely to provide poorer performance as the peak of a pulse is not a good monotonic indicator of pulse energy, particularly when the detector is operating in a non-linear region.

The measurement of pulse intensity is critical in making accurate range measurements when the associated timing measurements are made between times at which the pulses exceed a threshold and the required precision is significantly smaller than the pulse rise time. When the pulse returning from a target is larger, the threshold is exceeded sooner, and this leads to an apparently shorter distance (ranging error). An accurate measure of pulse intensity, such as provided by a gated integrator, provides an effective means of compensating for this apparent error in range measurement. In an alternative embodiment, a peak detector can be used to estimate pulse intensity; however this provides much less accurate range compensation—particularly when the detector is operating in saturation.

In a single pixel lidar implementation, the gated integrator can be triggered in advance of the arrival of the received pulse by the introduction of a delay line of a few nanoseconds. However, in an array implementation, the introduction of such a delay line at each pixel would be prohibitive. In one embodiment, such as is shown in FIG. 9, two gated integrators 164 and 166 are employed alternately, and the integration on each is over a time that is at least as long as the longest pulse that will be observed. When the return pulse is detected, the alternation between integrators is stopped, and the last integrated pulse is utilized to compensate the range measurement. In one embodiment, reflected pulses are 1-20 ns in length when they reach detector 136. In such an embodiment, one could design gated integrators 164 and 166 to integrate over 20 ns, with an overlap of 10 ns.

A method of determining the transit time for an optical pulse will be described next. The simplest approach to measuring time interval between two pulses is to enable a counter when the first pulse arrives, stop the counter when the second pulse arrives, and record the number of counts. The number of counts times the clock period will be the time. The basic problem with this is that in order to have a resolution of 1 mm, the clock frequency would have to be approximately 200 GHz. This is neither economic nor practical for a large array of sensors.

Timing circuit 138 stretches the time interval two or more times, so that a more modest clock frequency can be utilized to achieve the required accuracy. The fundamental concept of this interpolator is to create a linear charging ramp on a capacitor when the first pulse arrives, begin discharging this capacitor at a different rate after a fixed number of master clock pulses, and enable a counter on the master clock pulses until the capacitor arrives at its original state. Implementations of this process have been previously called Nutt interpolators.

Figure 10:
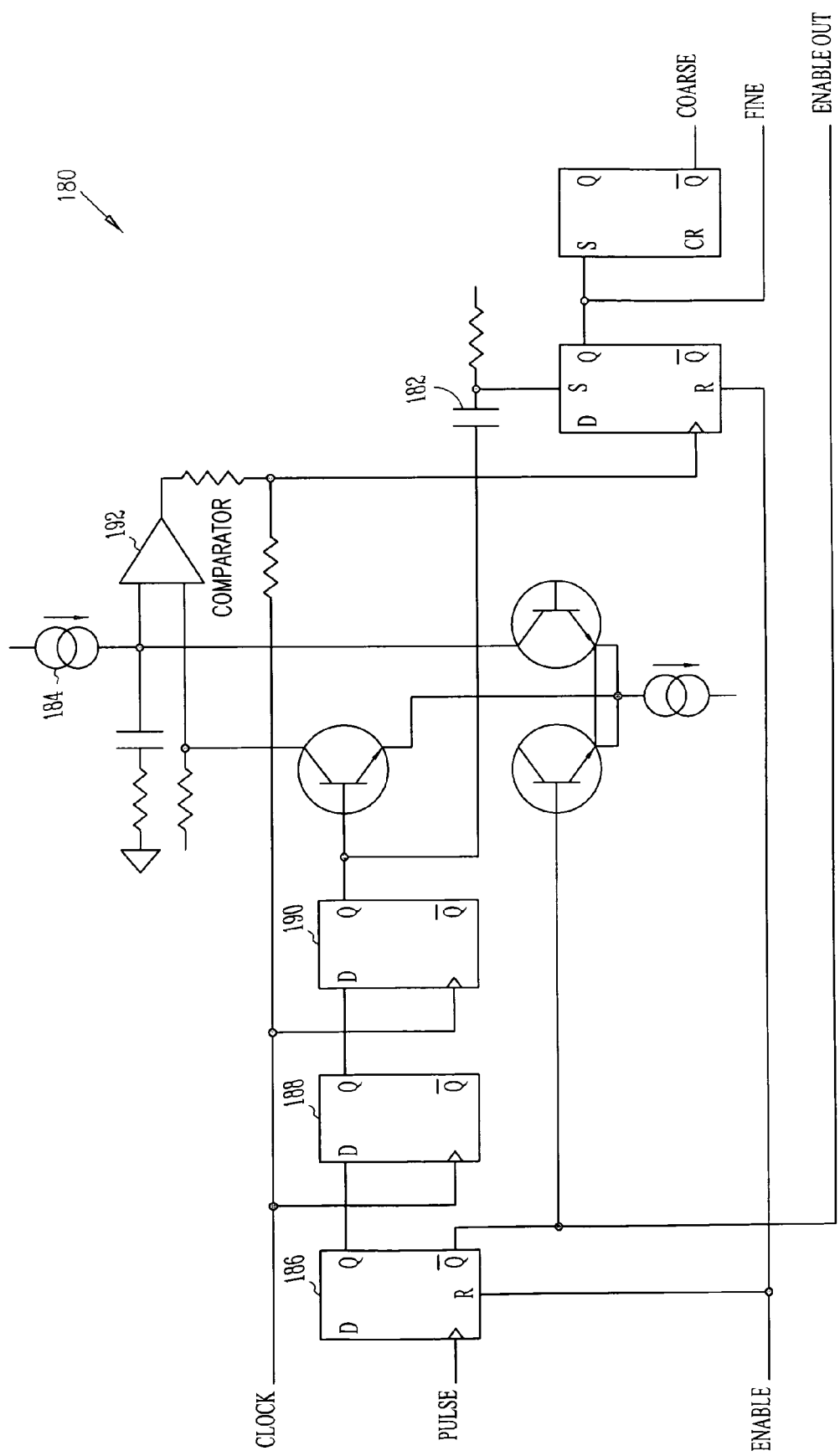
FIG. 10 illustrates an interpolator which can be used in the timing circuit of FIG. 9.

In one embodiment, each time converter 160 and 162 includes at least one interpolator. An interpolator measures the time between an asynchronous event and a subsequent master clock pulse. In one embodiment, each interpolator includes an interpolator circuit which charges a capacitor at a different rate than it discharges. An example interpolator circuit 180 is shown in FIG. 10.

As illustrated in FIG. 6, before a triggering event (such as a pulse) arrives, integrating capacitor 182 is held at a high level by upper current source 184. When enabled, flip-flop 186 waits for a pulse and the coarse counter is enabled. When a pulse arrives, flip-flop 186 is clocked, and that in turn causes integrating capacitor 180 to be discharged by a lower current source 185 at a high rate, and the fine counter is enabled. When the transition of flip-flop 188 propagates through the synchronizing flip-flops 188 and 190, integrating capacitor 182 is then charged again by upper current source 184. When the output of comparator 192 shows that the integrating capacitor has returned to its original level, the fine counter is disabled.

In one interpolator embodiment, two or more separate interpolator circuits 180 are cascaded, with the discharge of one triggered when the previous capacitor has returned to a threshold value.

In one such embodiment, an interpolator includes five or six cascaded interpolator circuits 180; the discharge of one interpolator circuit 180 is triggered when the previous capacitor has returned to a threshold value. In one five interpolator circuit embodiment, the clock operates at 100 Mhz and the rate of charging for each capacitor is 8-16 (corresponding to 3 or 4 bits) times the rate of discharging. If the rate of charging is 8 times that of discharging, such an embodiment leads to a total interpolation of 8^5 or 32,768 times the rate of discharging. Interpolation capacitors may, for instance, be on the order of 8-20 fF, with the charging/discharging currents about 200-800 nA.

An alternative approach is to provide a single slope measurement of the timing interpolation, saving the voltage on the interpolator until after all the pixel measurements are performed. At that point the interpolated value can be multiplexed off the chip with an analog multiplexer, rather than a digital multiplexer as provided in the dual slope implementation. These values would then be converted by an off-chip analog-to-digital converter.

When a pulse is detected, a capacitor will be charged at a fixed rate until a subsequent transition of the master clock. The value of the voltage on the capacitor will be proportional to the time between the pulse and this clock edge. The multiplexer, in this case, will transmit an analog voltage off chip.

In the case of a single slope timing interpolator, it is preferable to use an analog multiplexer to transfer both the interpolator and intensity measurements off-chip.

The value of the intensity measurement, whether it corresponds to a peak detection or a gated integrator, can be either digitized at the pixel and multiplexed as a digital value or it can be multiplexed as an analog voltage to an off-chip analog-to-digital converter. Nearly identical circuitry will suffice to digitize the intensity as was used to measure the interpolated voltage—a counter will determine how long it takes to reduce the stored voltage to an original value. When the dual slope time-to-digital interpolator is utilized, it is preferable to digitize the intensity measurement at the pixel as much of the timing interpolator circuitry can be reused.

As noted above, system 100 also may include a resonator/attenuator 114 used to calibrate system 100. One impediment to making highly accurate measurements with an individual pixel is the variation of circuit properties that can occur during operation, including variations of laser pulse properties, environmental conditions and aging. Additionally, within an array individual pixels may behave differently, and the variation of their behavior may not track with environmental conditions or time. Also, when the detectors operate in saturation, the intensity measurement may not be linear. Consequently it is important to incorporate components which can allow the system to compensate for these behaviors across the array.

In one embodiment, resonator/attenuator 114 is added to characterize the properties of individual pixels and their variation as a function of pulse properties, environmental conditions, and aging; and the variation of behavior within the array. The principle function of this assembly is to provide a known range of signals to the receiver, essentially simulating the circumstances the receiver would experience when presented with a test object but within the confines of the instrument. When in calibration mode, the instrument will be presented with a sequence of pulses from the resonator/attenuator 114, and measured results from this will be subsequently used to adjust the measurements taken from real objects.

Embodiments of calibration devices and methods of use are described in the U.S. patent application entitled "System and Method for Determining Range in 3D Imaging Systems" described above, the descriptions of which is incorporated herein by reference.

When the laser pulse rise time is comparable to the desired precision, range walk compensation is no longer necessary, and a pulse intensity measurement is not needed. When the receiving detector array is operated in non-linear Geiger mode (as in Marino above), a single received photon can cause a state transition in the receiver. In this case, the measurement of received pulse intensity can only be determined on a statistical basis. However, the if the pulse is large enough to have a high likelihood of being detected, then it is most likely that the received photon appears in the rise time of the laser. Thus, if the laser pulse rise time is comparable to the desired precision, no pulse intensity measurement will be needed to compensate for any apparent range walk. So to achieve 5 mm resolution, a laser pulse with a rise time shorter than 35 psec will be adequate to ensure that no range walk correction will be required.

When the array is used to measure the inside of a sphere that is centered at the camera, all the pixels should report the same range. Further, this should true for any size sphere. However, variations in timing offset and scale will cause the measurements to deviate from this idealization. A table of offsets and corrections for each pixel can be developed, and typically this can be accomplished with any known surface at more than one range. Typically, a flat surface would be measured at two or more ranges, and the measured results would then be applied to all the pixels in subsequent measurements.

This procedure has major drawbacks. If the correction table is created in the factory, the corrections are unlikely to remain constant over time and temperature to millimeter accuracy, principally because of variations in component parameters with temperature or aging. The procedure would have to be applied periodically. However, the procedure cannot be conveniently applied in the field, as suitable flat surfaces are unlikely to be conveniently available. Even if suitable fixtures were available, it would be unknown when or how often they should be applied. Further, the system operator would be required to execute a special procedure, and his future results would be dependent on how well the procedure was followed.

Resonator/attenuator 114 imposes the same pulse delay pattern across the detector array every time since the geometry of the components will be unchanged. A single factory calibration of the apparent differences across the array can be supplemented with the apparent differences at the moment the array uniformity is being field evaluated, and the sum of these corrections can be applied to every pixel when applied to real objects.

While timing interpolators are designed to provide an accurate, linear measure of the elapsed time between asynchronous events and system clock pulses, real circuits can only provide an approximation. The difference can become exceedingly important when attempting to make measurements with picosecond precision, and also when the interpolation ratios are large.

The nonlinearity at each pixel can be determined quite accurately if the pulse arrival times are not coherent with the system clock. In that case, the likelihood of making a measurement resulting in one of the potential interpolated values will be proportional to the likelihood of the associated pulse arriving in the associated time slot allocated to that value. So if the time T between clock periods is divided into M time slots with end points $t_0, \ldots, t_M$, a large number of time measurements over all the pixels will result in a distribution $\{n_k; k=1 \ldots M\}$ of time measurements with resulting interpolated values in these time slots; that is, on each occasion we see an interpolated value t with $t_{i-1}<t<t_i$, we increment $n_i$. If the interpolator was truly linear, then this distribution would be uniform; to the extent it is not uniform, a linearization of future measurements can be expected to delivery superior accuracy. If the total number of measurements is $$N = \sum_k n_k,$$

then an approximate measure of the proportion of measurements landing in the $k^{th}$ time slot is $n_k/N$. There are a few similar and reasonable ways to correct future measurements on the basis of these observations, but a sensible (and successful) approach is to assign each new interpolated value the time associated with the center of the time slot during which it occurs. Accordingly, a sensible set of approximate correction factors can be estimated as $$t_k^c = \frac{T}{N}\left(\sum_{i<k} n_i + \frac{n_k}{2}\right).$$

When future timing measurements are made, and an interpolation between system clock values lies between $t_{k-1}$ and $t_k$, the value $t_k^c$ will be used in its place.

Slope compensation will be discussed next. When the surfaces being measured are not normal to the laser radar, additional calculations must be made to enhance the system accuracy. For instance, if the outgoing laser beam is 5 mm in diameter at the target object, but hits a surface which is inclined at 60 degrees from the normal, the pulse return will be distributed over an area which has almost a 9 mm extent in range. Therefore the return pulse could be as long as 58 psec, even if the outgoing pulse is instantaneous. In general, the calculated range will be somewhere within the observed return spot. If the desired range is that of the center of the spot, as would normally be the case, the surface normal must be known to adjust the range walk for the increase in pulse width—otherwise the range walk correction will be smaller than necessary by approximately the amount the pulse has been elongated.

A two step process is applied to obtain enhanced range information on inclined surfaces While the ranges to inclined surfaces will be underestimated, the normal to these surfaces will be well approximated if adjacent samples are on the same region. Therefore, a good approximation of the surface normal can be obtained uncorrected data. Then, in a second step, the range to the center of the laser spot can be determined by increasing the first range estimate in accordance with this normal estimate.

Oversampling will be discussed next. In some cases it may be possible to enhance the spatial resolution of a range image after the data has been acquired, as well as the associated intensity image. This is true for both a range image acquired by a lidar array as well as one which has been acquired by a laser scanner that has been intentionally over-sampled. The algorithm for range image enhancement is similar to ones that have been used in digital photography.

Let $o(x,y)$ represent the range distribution associated with an object, and let $r(x,y)$ represent the range distribution associated with a blurred image of that object. We assume that the blur the image has been subjected to is a linear, space-invariant transformation, describable by a known space-invariant point-spread function $s(x,y)$. Then the object and the image are related by:

$$r(x,y) = \iint o(\xi,\eta)s(x-\xi,y-\eta)d\xi d\eta$$

We seek to obtain an estimate $\hat{o}(x,y)$ of $o(x,y)$, based on the measured range image $r(x,y)$ and the known point-spread function $s(x,y)$.

Using the relationship between object and image in the frequency domain, $$F\{r(x,y)\} = F\{s(x,y) \otimes o(x,y)\} = S(f_X, f_Y)O(f_X, f_Y)$$

an estimate of the spectrum of the original object can be obtained by simply multiplying the image spectrum by a restoration filter H, $$\hat{O}(f_X, f_Y) = H(f_X, f_Y)R(f_X, f_Y),$$

where the restoration filter H, is given by $H(f_X, f_Y) = S^{-1}(f_X, f_Y)$.

An improvement of this estimate can be achieved by assuming the image is embedded in noise, and is represented by:

$$r(x,y) = o(x,y) \hat{\ast} s(x,y) + n(x,y)$$

Where $n(x,y)$ is the noise associated with the detection process. If the power spectral densities of the object and the noise are represented by $\Phi_o(f_X, f_Y)$ and $\Phi_n(f_X, f_Y)$, then the transfer function of the optimum restoration filter is given by:

$$H(f_X, f_Y) = \frac{S^*(f_X, f_Y)}{|S(f_X, f_Y)|^2 + \frac{\phi_n(f_X, f_Y)}{\phi_o(f_X, f_Y)}}$$

The present invention provides a system and method for three dimensional imaging of objects in a three-dimensional scene. The imaging system includes a light source, a detector array, a timing circuit, an inertial guidance system and a processor. The light source generates an optical pulse and projects the optical pulse on an object so that it is reflected as a reflected pulse. The detector array includes a plurality of detectors, wherein the detectors are oriented to receive the reflected pulse. The timing circuit is connected to the detector array. It determines when the reflected pulse reached detectors on the detector array. The inertial guidance system measures angular velocity and acceleration. The processor is connected to the timing circuit and the inertial guidance system. The processor forms a composite image of the three-dimensional scene as a function of camera position and range to objects in the three-dimensional scene.

A camera operator scans a room by pointing the camera to different spots in the rooms. The inertial guidance system continuously measures movement of the camera relative to an initial position and forms a range image for two or more of the spots where the camera is pointed. An estimated camera motion is determined consistent with measurements from the inertial guidance system and a composite image is formed from the two or more range images, wherein forming a composite image includes determining alignment of the two or more range images as a function of the estimated camera motion.

In the above discussion, the term "computer" and "processor" are defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A method of imaging a three-dimensional scene having one or more objects, comprising:
   providing a camera, wherein the camera includes an inertial guidance system and an array of optical detectors;
   transmitting a first optical pulse so that a portion of the first optical pulse is reflected from the scene as a first reflected pulse;
   detecting arrival of the first reflected pulse at the array of detectors;
   forming a first scene image from data corresponding to the first reflected pulse arriving at the array of detectors;
   moving the camera relative to objects in the scene;
   monitoring angular velocity and acceleration via the inertial guidance system;
   transmitting a second optical pulse so that a portion of the second optical pulse is reflected from the scene as a second reflected pulse;
   detecting arrival of the second reflected pulse at the array of detectors;
   forming a second scene image from data corresponding to the second reflected pulse arriving at the array of detectors;
   determining a range estimate of camera position as a function of registration of the first and second range images;
   determining camera position and trajectory as a function of the range estimate, the angular velocity measured by the inertial guidance system and the acceleration measured by the inertial guidance system, wherein determining includes combining the range estimate with the angular velocity measured by the inertial guidance system and the acceleration measured by the inertial guidance system to arrive at a composite camera position and a composite camera trajectory that minimizes sensor measurement errors and image alignment errors; and
   forming a composite image of the three-dimensional scene as a function of the first and second scene images, the composite camera position, and the composite camera trajectory.

2. The method of claim 1, wherein the inertial guidance system includes gyroscopes and accelerometers.

3. The method of claim 1, wherein the inertial guidance system includes a global positioning system, gyroscopes and accelerometers.

4. The method of claim 1, wherein combining the range estimate with the angular velocity measured by the inertial guidance system and the acceleration measured by the inertial guidance system includes applying a Kalman filter to the range estimate, the angular velocity measured by the inertial guidance system and the acceleration measured by the inertial guidance system to arrive at the composite camera position and the composite camera trajectory.

5. The method of claim 4, wherein the inertial guidance system includes a global positioning system, a gyroscope and an accelerometer and wherein combining further includes correcting the camera position and the camera trajectory as a function of a global positioning measurement.

6. A method of imaging a three-dimensional scene having one or more objects, comprising:
- providing a camera, wherein the camera includes an inertial guidance system and an array of optical detectors;
- transmitting a first optical pulse so that a portion of the first optical pulse is reflected from the scene as a first reflected pulse;
- detecting arrival of the first reflected pulse at the array of detectors;
- forming a first scene image from data corresponding to the first reflected pulse arriving at the array of detectors;
- moving the camera relative to objects in the scene;
- monitoring angular velocity and acceleration via the inertial guidance system;
  - transmitting a second optical pulse so that a portion of the second optical pulse is reflected from the scene as a second reflected pulse;
- detecting arrival of the second reflected pulse at the array of detectors;
- forming a second scene image from data corresponding to the second reflected pulse arriving at the array of detectors;
- determining a range estimate of camera position as a function of registration of the first and second range images;
- determining camera position and trajectory as a function of the range estimate and of the angular velocity and acceleration measured by the inertial guidance system, wherein determining includes combining the range estimate with the angular velocity and acceleration measured by the inertial guidance system to arrive at a composite camera position and a composite camera trajectory, wherein combining the range estimate with the angular velocity and acceleration measured by the inertial guidance system includes applying a Kalman filter to each of the range estimate, the angular velocity measured by the inertial guidance system, and the acceleration measured by the inertial guidance system to determine camera position and trajectory; and
- forming a composite image of the three-dimensional scene as a function of the first and second scene images, the composite camera position, and the composite camera trajectory.

7. The method of claim 6, wherein the inertial guidance system includes a gyroscope and an accelerometer.

8. The method of claim 6, wherein the inertial guidance system includes a global positioning system, a gyroscope and an accelerometer and wherein combining includes applying a Kalman filter to each of the range estimate, the angular velocity and the acceleration to arrive at the camera position and the camera trajectory and then correcting the camera position and the camera trajectory as a function of a global positioning measurement.

9. A camera for imaging a three-dimensional scene having one or more objects, comprising:
- a light source, wherein the light source generates an optical pulse and projects the optical pulse on an object so that it is reflected as a reflected pulse;
- a detector array, wherein the detector array may includes a plurality of detectors, wherein the detectors are oriented to receive the reflected pulse;
- a timing circuit connected to the detector array, wherein the timing circuit determines when the reflected pulse reached detectors on the detector array;
- an inertial guidance system which measures angular velocity and acceleration; and
- a processor connected to the timing circuit and the inertial guidance system, wherein the processor calculates a range estimate of camera position as a function of registration of range images from consecutive pulses and wherein the processor determines camera position and trajectory by combining information corresponding to the range estimate with information corresponding to the angular velocity and acceleration and forms a composite image of the three-dimensional scene as a function of camera position and range to objects in the three-dimensional scene;
- wherein combining includes calculating camera position and trajectory in a way that minimizes sensor measurement errors and image alignment errors.

10. The camera according to claim 9, wherein the light source is a laser.

11. A camera for imaging a three-dimensional scene having one or more objects, comprising:
- a light source, wherein the light source generates an optical pulse and projects the optical pulse on an object so that it is reflected as a reflected pulse;
- a detector array, wherein the detector array may includes a plurality of detectors, wherein the detectors are oriented to receive the reflected pulse;
- a timing circuit connected to the detector array, wherein the timing circuit determines when the reflected pulse reached detectors on the detector array;
- an inertial guidance system which measures angular velocity and acceleration; and a processor connected to the timing circuit and the inertial guidance system, wherein the processor calculates a range estimate of camera position as a function of registration of range images from consecutive pulses and wherein the processor determines camera position and trajectory by combining information corresponding to the range estimate with information corresponding to the angular velocity and acceleration and forms a composite image of the three-dimensional scene as a function of camera position and range to objects in the three-dimensional scene;
- wherein the processor combines information corresponding to the range estimate with information corresponding to the angular velocity and acceleration received from the inertial guidance system by applying a Kalman filter to the range estimate and to the angular velocity and acceleration measured by the inertial guidance system.

12. The device according to claim 11, wherein the light source is a laser.

13. The device according to claim 12, wherein the detectors are avalanche photodiodes operating in non-linear Geiger mode.

14. A device for imaging a three-dimensional scene having one or more objects, including:
- a pulsed light source;
- means for transmitting light toward said objects;
- optics for collecting light during the time for light to transit from said pulsed light source, reflect from said objects, be collected and focused by said optics;
- a plurality of detectors oriented for receiving the collected light and converting the collected light into an electrical signal;
- timing means, connected to the detectors, for determining a transit time for a pulse to leave the pulsed light source, reflect off the objects and return to one or more of the plurality of deflectors;

an inertial guidance system which measures angular velocity and acceleration; and a processor connected to the timing means and the inertial guidance system, wherein the processor calculates a range estimate of camera position as a function of registration of range images from consecutive pulses and wherein the processor determines camera position and trajectory by combining information corresponding to the range estimate with information corresponding to the angular velocity and acceleration and forms a composite image of the three-dimensional scene as a function of range to objects in the three-dimensional scene and camera position and trajectory;

wherein the processor combines information corresponding to the range estimate with information corresponding to the angular velocity and acceleration received from the inertial guidance system so as to minimize sensor measurement errors and image alignment errors.

15. The device according to claim 14, wherein the light source is a laser.

16. The device according to claim 15, wherein the detectors are avalanche photodiodes operating in non-linear Geiger mode.

17. A device for imaging a three-dimensional scene having one or more objects, including:

a pulsed light source;

means for transmitting light toward said objects;

optics for collecting light during the time for light to transit from said pulsed light source, reflect from said objects, be collected and focused by said optics;

a plurality of detectors oriented for receiving the collected light and converting the collected light into an electrical signal;

timing means, connected to the detectors, for determining a transit time for a pulse to leave the pulsed light source, reflect off the objects and return to one or more of the plurality of deflectors;

an inertial guidance system which measures angular velocity and acceleration; and a processor connected to the timing means and the inertial guidance system, wherein the processor calculates a range estimate of camera position as a function of registration of range images from consecutive pulses and wherein the processor determines camera position and trajectory by combining information corresponding to the range estimate with information corresponding to the angular velocity and acceleration and forms a composite image of the three-dimensional scene as a function of range to objects in the three-dimensional scene and camera position and trajectory;

wherein the processor combines information corresponding to the range estimate with information corresponding to the angular velocity and acceleration received from the inertial guidance system by applying a Kalman filter to the range estimate and to the angular velocity and acceleration measured by the inertial guidance system.

18. The device according to claim 17, wherein the light source is a laser.

19. The device according to claim 18, wherein the detectors are avalanche photodiodes operating in non-linear Geiger mode.

20. A method of imaging a three-dimensional scene having one or more objects, comprising:

providing a camera, wherein the camera includes an inertial guidance system and one or more optical detector arrays;

transmitting a first optical pulse so that a portion of the first optical pulse is reflected from the scene as a first reflected pulse;

detecting arrival of the first reflected pulse at the one or more optical detector arrays;

recording first range information as a function of the arrival of the first reflected pulse;

forming a first scene image from the first range information;

moving the camera relative to objects in the scene;

recording angular velocity and acceleration information;

transmitting a second optical pulse so that a portion of the second optical pulse is reflected from the scene as a second reflected pulse;

detecting arrival of the second reflected pulse at the one or more optical detector arrays;

recording second range information as a function of the arrival of the second reflected pulse;

forming a second scene image from the second range information;

determining a range estimate of camera position as a function of registration of the first and second range images;

estimating camera position and camera trajectory as a function of the range estimate and of the recorded angular velocity information and the recorded acceleration information, wherein estimating includes combining the range estimate with the angular velocity information and the recorded acceleration information to arrive at a composite camera position and a composite camera trajectory; and forming a composite image of the three-dimensional scene as a function of the composite camera position, the composite camera trajectory, the recorded first range information and the recorded second range information;

wherein combining includes applying a process to each of the range estimate, the angular velocity information and the recorded acceleration information to arrive at the composite camera position and the composite camera trajectory that minimizes sensor measurement errors and image alignment errors.

21. A method of imaging a three-dimensional scene having one or more objects, comprising:

providing a camera, wherein the camera includes an inertial guidance system and one or more optical detector arrays;

transmitting a first optical pulse so that a portion of the first optical pulse is reflected from the scene as a first reflected pulse;

detecting arrival of the first reflected pulse at the one or more optical detector arrays;

recording first range information as a function of the arrival of the first reflected pulse;

forming a first scene image from the first range information;

moving the camera relative to objects in the scene;

recording angular velocity and acceleration information;

transmitting a second optical pulse so that a portion of the second optical pulse is reflected from the scene as a second reflected pulse;

detecting arrival of the second reflected pulse at the one or more optical detector arrays;

recording second range information as a function of the arrival of the second reflected pulse;

forming a second scene image from the second range information;

determining a range estimate of camera position as a function of registration of the first and second range images;

estimating camera position and camera trajectory as a function of the range estimate and of the recorded angular velocity information and the recorded acceleration information, wherein estimating includes combining the range estimate with the angular velocity information and the recorded acceleration information to arrive at a composite camera position and a composite camera trajectory; and forming a composite image of the three-dimensional scene as a function of the composite camera position, the composite camera trajectory, the recorded first range information and the recorded second range information;

wherein the inertial guidance system includes a gyroscope and an accelerometer and wherein combining includes applying a Kalman filter to each of the range estimate, the angular velocity information and the recorded acceleration information to arrive at the composite camera position and the composite camera trajectory.

22. A method of imaging a three-dimensional scene having one or more objects, comprising:

providing a camera, wherein the camera includes an inertial guidance system and one or more optical detector arrays;

transmitting a first optical pulse so that a portion of the first optical pulse is reflected from the scene as a first reflected pulse;

detecting arrival of the first reflected pulse at the one or more optical detector arrays;

recording first range information as a function of the arrival of the first reflected pulse;

forming a first scene image from the first range information;

moving the camera relative to objects in the scene;

recording angular velocity and acceleration information;

transmitting a second optical pulse so that a portion of the second optical pulse is reflected from the scene as a second reflected pulse;

detecting arrival of the second reflected pulse at the one or more optical detector arrays;

recording second range information as a function of the arrival of the second reflected pulse;

forming a second scene image from the second range information;

determining a range estimate of camera position as a function of registration of the first and second range images;

estimating camera position and camera trajectory as a function of the range estimate and of the recorded angular velocity information and the recorded acceleration information, wherein estimating includes combining the range estimate with the angular velocity information and the recorded acceleration information to arrive at a composite camera position and a composite camera trajectory; and forming a composite image of the three-dimensional scene as a function of the composite camera position, the composite camera trajectory, the recorded first range information and the recorded second range information;

wherein the inertial guidance system includes a global positioning system, a gyroscope and an accelerometer and wherein combining includes applying a Kalman filter to each of the range estimate, the recorded angular velocity information and the recorded acceleration information to arrive at the composite camera position and the composite camera trajectory and then correcting the composite camera position and composite camera trajectory as a function of a global positioning measurement.

23. A system for imaging a three dimensional scene, comprising:

a focal plane array range imaging optical pulsing camera; and an inertial guidance system, connected to the camera, wherein the inertial guidance system provides angular velocity and acceleration information corresponding to movements of the camera; and a processor, connected to the camera and to the inertial guidance system, wherein the processor calculates a range estimate of camera position as a function of registration of range images from consecutive pulses, wherein the processor estimates camera position and trajectory by combining information corresponding to the range estimate with information corresponding to the angular velocity and acceleration measured by the inertial guidance system and wherein the processor forms a composite image of the three-dimensional scene as a function of camera position, camera trajectory and range information measured by the camera;

wherein the processor combines information corresponding to the range estimate with information corresponding to the angular velocity and acceleration received from the inertial guidance system so as to minimize sensor measurement errors and image alignment errors.

24. The system of claim 23, wherein the inertial guidance system includes a gyroscope and an accelerometer.

25. The system of claim 23, wherein the light source is a laser.

26. The system of claim 25, wherein the detectors are avalanche photodiodes operating in non-linear Geiger mode.

27. A system for imaging a three dimensional scene, comprising:

a focal plane array range imaging optical pulsing camera; and an inertial guidance system, connected to the camera, wherein the inertial guidance system provides angular velocity and acceleration information corresponding to movements of the camera; and a processor, connected to the camera and to the inertial guidance system, wherein the processor calculates a range estimate of camera position as a function of registration of range images from consecutive pulses, wherein the processor estimates camera position and trajectory by combining information corresponding to the range estimate with information corresponding to the angular velocity and acceleration measured by the inertial guidance system and wherein the processor forms a composite image of the three-dimensional scene as a function of camera position, camera trajectory and range information measured by the camera;

wherein the inertial guidance system includes a global positioning system, gyroscopes and accelerometers and wherein combining includes applying a Kalman filter to each of the range estimate, the angular velocity and the acceleration to arrive at the camera position and the camera trajectory and then correcting the camera position and the camera trajectory as a function of a global positioning measurement.

28. A system for imaging a three dimensional scene, comprising:

a focal plane array range imaging optical pulsing camera; and an inertial guidance system, connected to the camera, wherein the inertial guidance system provides angular velocity and acceleration information corresponding to movements of the camera; and a processor, connected to the camera and to the inertial guidance system, wherein the processor calculates a range estimate of camera position as a function of registration of range images from consecutive pulses, wherein the processor estimates camera position and trajectory by combining information corresponding to the range estimate with information corresponding to the angular velocity and acceleration measured by the inertial guidance system and wherein the processor forms a composite image of the three-dimensional scene as a function of camera position, camera trajectory and range information measured by the camera;

wherein combining includes applying a Kalman filter to each of the range estimate, the angular velocity and the acceleration to arrive at the camera position and the camera trajectory.

29. The system of claim 28, wherein the inertial guidance system includes a gyroscope and an accelerometer.

30. The system of claim 28, wherein the inertial guidance system includes a global positioning system, a gyroscope and an accelerometer and wherein the processor estimates camera trajectory and range image registration as a function of camera position, camera trajectory, range information measured by the camera and a global positioning measurement measured by the global positioning system.

31. The system of claim 28, wherein the inertial guidance system includes a level, a global positioning system, a gyroscope and an accelerometer and wherein the processor estimates camera trajectory and range image registration as a function of camera position, camera trajectory, range information measured by the camera and a global positioning measurement measured by the global positioning system.

32. The system of claim 28, wherein the inertial guidance system includes a compass, a level, a global positioning system, a gyroscope and an accelerometer and wherein the processor estimates camera trajectory and range image registration as a function of camera position, camera trajectory, range information measured by the camera and a global positioning measurement measured by the global positioning system.

33. A method for collecting range images from a focal plane array imaging optical pulsing camera and placing them on a common coordinate system, the method comprising:

attaching an inertial guidance system to the camera, wherein the inertial guidance system includes a set of gyroscopes and accelerometers;

continuously measuring the set of gyroscopes and accelerometers;

recording first range information at a first camera position;

recording second range information at a second camera position;

determining an estimated camera motion in moving the camera from the first to the second camera position consistent with the first and second range information and the measurements from the set of gyroscopes and accelerometers attached to the camera, wherein determining an estimated camera motion includes combining range estimate information reflecting movement of the camera between the first and second range images with inertial guidance information reflecting movement of the camera as measured by the set of gyroscopes and accelerometers attached to the camera to arrive at a camera position and trajectory; and forming a composite image from the first and second range images; wherein forming a composite image includes determining alignment of the first and second range images as a function of the estimated camera motion;

wherein combining includes applying a process to each of the range estimate information and the inertial guidance information to arrive at the camera position and the camera trajectory that minimizes sensor measurement errors and image alignment errors.

34. The method of claim 33, wherein combining includes applying a Kalman filter to the range estimate information and the inertial guidance information to arrive at the camera position and the camera trajectory.

35. The method of claim 33, wherein the inertial guidance system further includes a global positioning system and wherein combining includes applying a Kalman filter to the range estimate information, to global positioning system information and to the inertial guidance information to arrive at the camera position and the camera trajectory.

36. A method of imaging a three-dimensional scene having one or more objects, comprising:

receiving two-dimensional information reflective of a first scene captured by an imaging device;

receiving two-dimensional information reflective of a second scene captured by the imaging device;

calculate a range estimate as a function of the first and second scenes;

receiving angular velocity and acceleration via an inertial guidance system, wherein the angular velocity and the acceleration reflect movement of the imaging device between the first and the second scenes;

determining position and trajectory of the imaging device as a function of the range estimate and of the angular velocity and acceleration measured by the inertial guidance system and movement of the imaging device reflected by changes in scene registration, wherein determining includes combining the range estimate with the angular velocity and acceleration measured by the inertial guidance system to arrive at a composite position and a composite trajectory for the imaging device; and forming a composite image of the three-dimensional scene as a function of the first and second scenes and the composite position and the composite trajectory of the imaging device;

wherein combining the angular velocity and acceleration measured by the inertial guidance system and the movement of the imaging device reflected by changes in scene registration includes passing data representing the angular velocity and acceleration measured by the inertial guidance system and data representing the movement of the imaging device reflected by changes in scene registration through a process that minimizes sensor measurement errors and image alignment errors.

37. A method of imaging a three-dimensional scene having one or more objects, comprising:

receiving two-dimensional information reflective of a first scene captured by an imaging device;

receiving two-dimensional information reflective of a second scene captured by the imaging device;

calculate a range estimate as a function of the first and second scenes;

receiving angular velocity and acceleration via an inertial guidance system, wherein the angular velocity and the acceleration reflect movement of the imaging device between the first and the second scenes;

determining position and trajectory of the imaging device as a function of the range estimate and of the angular velocity and acceleration measured by the inertial guidance system and movement of the imaging device reflected by changes in scene registration, wherein determining includes combining the range estimate with the angular velocity and acceleration measured by the inertial guidance system to arrive at a composite position and a composite trajectory for the imaging device; and forming a composite image of the three-dimensional scene as a function of the first and second scenes and the composite position and the composite trajectory of the imaging device;

wherein combining the angular velocity and acceleration measured by the inertial guidance system and the movement of the imaging device reflected by changes in scene registration includes passing data representing the angular velocity and acceleration measured by the inertial guidance system and data representing the movement of the imaging device reflected by changes in scene registration through a Kalman filter.

38. A method of imaging a three-dimensional scene having one or more objects, comprising:

receiving two-dimensional information reflective of a first scene captured by an imaging device;

receiving two-dimensional information reflective of a second scene captured by the imaging device;

calculate a range estimate as a function of the first and second scenes;

receiving angular velocity and acceleration via an inertial guidance system, wherein the angular velocity and the acceleration reflect movement of the imaging device between the first and the second scenes;

determining position and trajectory of the imaging device as a function of the range estimate and of the angular velocity and acceleration measured by the inertial guidance system and movement of the imaging device reflected by changes in scene registration, wherein determining includes combining the range estimate with the angular velocity and acceleration measured by the inertial guidance system to arrive at a composite position and a composite trajectory for the imaging device; and forming a composite image of the three-dimensional scene as a function of the first and second scenes and the composite position and the composite trajectory of the imaging device;

wherein combining the angular velocity and acceleration measured by the inertial guidance system and the movement of the imaging device reflected by changes in scene registration includes passing data representing the angular velocity and acceleration measured by the inertial guidance system, data corresponding to global positioning measurements and data representing the movement of the imaging device reflected by changes in scene registration though a Kalman filter.

39. A method of imaging a three-dimensional scene having one or more objects, comprising:

providing a camera, wherein the camera includes an inertial guidance system and an array of optical detectors;

transmitting a first optical pulse so that a portion of the first optical pulse is reflected from the scene as a first reflected pulse;

detecting arrival of the first reflected pulse at the array of detectors so as to form a first range image;

moving the camera relative to objects in the scene;

monitoring angular velocity and acceleration said the inertial guidance system;

transmitting a second optical pulse so that a portion of the second optical pulse is reflected from the scene as a second reflected pulse;

detecting arrival of the second reflected pulse at the array of detectors so as to form a second range image;

determining a range estimate of camera position as a function of registration of the first and second range images;

determining the camera position and the camera trajectory by integrating, using a Kalman filter the registration estimates with the angular velocity and acceleration measured by the inertial guidance system; and forming a composite image of the three-dimensional scene as a function of camera position, camera trajectory and range to objects in the three-dimensional scene.

40. The method of claim 39, wherein the inertial guidance system includes a global positioning system, gyroscopes and accelerometers.

41. A device for imaging a three-dimensional scene having one or more objects, including:

a pulsed light source;

means for transmitting a first and second light pulse toward said objects;

optics for collecting light during the time for light to transit from said pulsed light source, reflect from said objects, be collected and focused by said optics;

an array of optical detectors oriented for receiving the collected light and converting the collected light into an electrical signal;

timing means, connected to the optical detectors, for determining a transit time for a pulse to leave the pulsed light source, reflect off the objects and return to one or more of the plurality of deflectors;

an inertial guidance system which measures angular velocity and acceleration for the device; and a processor, connected to the timing means and the inertial guidance system, wherein the processor calculates a range estimate as a function of a first range image formed from the first light pulse and a second range image formed from the second light pulse and determines device position and trajectory as a function of both the range estimate and the angular velocity and acceleration of the device and forms a composite image of the three-dimensional scene as a function of camera position and trajectory and the range to objects in the three-dimensional scene;

wherein the processor combines information corresponding to the range estimate with information corresponding to the angular velocity and acceleration of the device so as to minimize sensor measurement errors and image alignment errors.

42. The device according to claim 41, wherein the processor combines information corresponding to the range estimate with information corresponding to the angular velocity and acceleration of the device using a Kalman filter, wherein the Kalman filter minimizes sensor measurement errors and image alignment errors.

43. The device according to claim 42, wherein the inertial guidance system includes a global positioning system, a gyroscope and an accelerometer and wherein the processor corrects the camera position and the camera trajectory as a function of a global positioning measurement.

44. The device according to claim 41, wherein the inertial guidance system includes a global positioning system, a gyroscope and an accelerometer and wherein the processor corrects the camera position and the camera trajectory as a function of a global positioning measurement.

45. A device for imaging a three-dimensional scene having one or more objects, comprising:

a pulsed light source;

means for transmitting a first and second light pulse toward said objects;

optics for collecting light during the time for light to transit from said pulsed light source, reflect from said objects, be collected and focused by said optics;

an array of optical detectors oriented for receiving the collected light and converting the collected light into an electrical signal;

timing means, connected to the optical detectors, for determining a transit time for a pulse to leave the pulsed light source, reflect off the objects and return to one or more of the plurality of deflectors;

an inertial guidance system which measures angular velocity and acceleration for the device; and a processor connected to the timing means and the inertial guidance system, wherein the processor calculates a range estimate as a function of a first range image formed from the first light pulse and a second range image formed from the second light pulse and determines device position and trajectory as a function of both the range estimate and the angular velocity and acceleration of the device and forms a composite image of the three-dimensional scene as a function of camera position and trajectory and the range to objects in the three-dimensional scene;

wherein the processor applies a Kalman filter to each of the range estimate, the angular velocity measured by the inertial guidance system and the acceleration measured by the inertial guidance system to determine device position and trajectory.

46. The device according to claim 45, wherein the Kalman filter estimates state at each time step, making a new linearization of the state space around the predicted state.

47. The device according to claim 45, wherein the processor detects registrations between non-consecutive scans and uses the registrations between non-consecutive scans with the registrations between consecutive scans to give an estimate of absolute positions for each scan.

48. The device according to claim 45, wherein the inertial guidance system includes a global positioning system, gyroscopes and accelerometers and wherein the processor applies a Kalman filter to each of the range estimate, changes in position measured by the global positioning system, the angular velocity measured by the inertial guidance system and the acceleration measured by the inertial guidance system to determine device position and trajectory.

49. The device according to claim 45, wherein the inertial guidance system includes a global positioning system, gyroscopes and accelerometers and wherein the processor applies a Kalman filter to each of the range estimate, the angular velocity measured by the inertial guidance system and the acceleration measured by the inertial guidance system to determine device position and trajectory and then combines adjusts the device position and trajectory as a function of changes in position measured by the global positioning system.

* * * * *

UNITED STATES PATENT AND TRADEMARK OFFICE
CERTIFICATE OF CORRECTION

PATENT NO. : 7,697,748 B2
APPLICATION NO. : 10/886079
DATED : April 13, 2010
INVENTOR(S) : Jerry Dimsdale et al.

It is certified that error appears in the above-identified patent and that said Letters Patent is hereby corrected as shown below:

On page 2, in column 2, under "Other Publications", line 4, delete "Laboratoy" and insert -- Laboratory --, therefor.

On page 2, in column 2, under "Other Publications", line 15, delete "Requriement" and insert -- Requirement --, therefor.

On page 2, in column 2, under "Other Publications", line 16, delete "Requriement" and insert -- Requirement --, therefor.

In column 6, line 14, delete "3d" and insert -- 3D --, therefor.

In column 8, line 58, after "(-)" insert -- , --.

In column 8, line 62, delete "$P_k(+)$" and insert -- $P_k(+)=$ --, therefor.

In column 9, line 9, delete "$P_k(-)$" and insert -- $P_k(-)=$ --, therefor.

In column 14, line 50, delete "$\overset{\frown}{x}$" and insert -- $\otimes$ --, therefor.

In column 14, line 63, delete "$\hat{x}s$" and insert -- $\otimes s$ --, therefor.

In column 20, line 41, in Claim 21, delete "haying" and insert -- having --, therefor.

In column 25, line 49, in Claim 38, delete "though" and insert -- through --, therefor.

In column 26, line 4, in Claim 39, delete "filter" and insert -- filter, --, therefor.

Signed and Sealed this

Sixth Day of July, 2010

David J. Kappos
*Director of the United States Patent and Trademark Office*